S. F. HAY.
Improvement in Curtain-Fixtures.
No. 129,889.
Patented July 30, 1872.
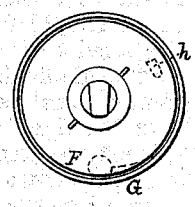 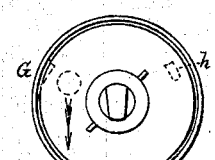 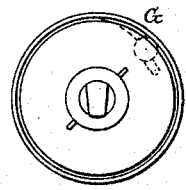
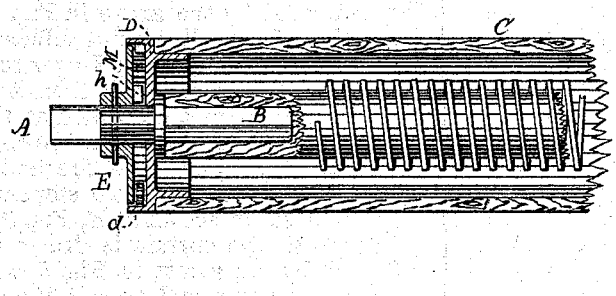 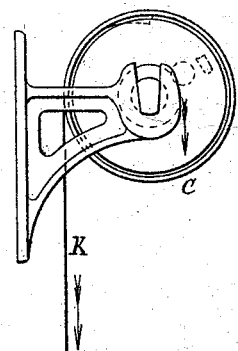
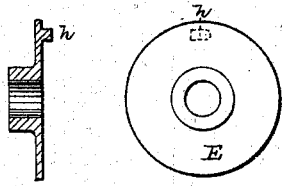 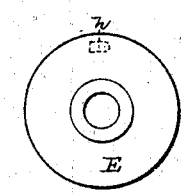
WITNESSES.
E. N. Eliot
Thos. W. Capen.
INVENTOR.
Saml. F. Hay

UNITED STATES PATENT OFFICE.

SAMUEL F. HAY, OF NEW YORK, N. Y.

IMPROVEMENT IN CURTAIN-FIXTURES.

Specification forming part of Letters Patent No. 129,889, dated July 30, 1872.

Specification describing certain Improvements in Curtain-Fixtures, invented by SAMUEL F. HAY, of the city, county, and State of New York.

My invention consists in the combination of two or more stops arranged within and near the circumference of a circular chamber mounted at one end of a spring-roller, one of which stops is attached to the fixed axis of the roller and the other to the part carrying the curtain, and between which a loose body, as a ball or disk, carried within said chamber, is so arranged as to be caught when the centrifugal force or recoil of the spring is sufficient to drive it to the circumference of said chamber.

Figures 1, 2, and 3 are diagrams to illustrate the action of the stops. Fig. 4 is a sectional view of said chamber, showing the stops and the loose disk and a portion of the spring and roller. Fig. 5 is an end view of the roller as seen mounted in the bracket. Figs. 6 and 7 are views of one of the disks which form the chamber.

A is the fixed axis, upon which one end of the roller turns, and to which one end of the spring B is fastened. C is the roller for carrying the curtain, and is chambered to receive the spring B, as shown in Fig. 4. At one end of the roller C a disk, D, is fastened in any convenient manner, as by a flange or projections forced tightly within the inner face of the spring-chamber of the roller. This disk D serves to close the end of the spring-chamber of the roller, and also as a bearing for it upon the axis A. Upon the circumference of said disk D a flange, as at $d$, is formed to extend out far enough to leave a space or chamber between it and a disk, E, mounted firmly upon the fixed axis A, and to inclose said disk on its circumference. The space between the two disks D and E, and which is surrounded by the flange $d$, forms a circular chamber, within which the loose body, as a disk, shown at F, may roll or travel. Upon the outer face of the disk D, and near its circumference, a projection or stop is formed, as shown at $g$, Figs. 1, 2, 3, 4, and 5. Said stop projects out nearly across the chamber and is inclined toward the circumference of the disk D, so that the loose ball or disk F will not be obstructed by it when the roller is turning in the direction indicated by the arrows in Figs. 2 and 5, but will easily ride over the inclined stop and drop behind it—that is, when its gravity is greater than its centrifugal force. Upon the inner face of the fixed disk E, and at a distance less than the diameter of the ball or disk F, but greater than its radius, and at some point above the fixed axis A, another stop, as at $h$, is placed, to extend inward nearly across the chamber, as shown at $h$, Fig. 4. Between this fixed stop $h$ on the disk E, which is firmly fastened to the axis or bracket, as most convenient, and the other stop, $g$, which is connected with the roller, the ball or disk F is caught, and stops the roller whenever the centrifugal force is sufficiently great to keep it out against the flange $d$ or circumference of the chamber M, and when the two stops are revolving toward each other or in the direction indicated by the arrow in Fig. 1; but if the motion of the roller is not sufficiently rapid to carry the ball or disk F over the axis A and against the fixed stop $h$, then it will drop away from the stop $g$, as shown at the arrow in Fig. 2, and the roller will not be checked by the stops. When, however, the ball or disk F is caught between the two stops it will occupy the position shown at F, Fig. 3, and remain so until the curtain is drawn down, as indicated by the arrow in Fig. 5, which will separate the stops and permit the disk F to drop to the bottom of the chamber, as indicated in the same figure. Let the line K, Fig. 5, represent the curtain, and it will be evident that if the spring is arranged, as at present in spring-rollers, to roll up the curtain, the motion must be sufficiently slow not to carry the ball or disk F up over the axis A and catch it between the stops; consequently the recoil of the spring is checked when its motion is very rapid, and the objectionable feature of rolling the curtain very rapidly is obviated.

If desired, more than one of the stops $g$ may be used, which will have the effect to check the recoil of the spring that much sooner; and it is also evident the ball or disk F may be of any irregular shape, as triangular, square, or polygonal, it being only required that it shall work freely in the chamber M and of the proper size to be readily caught between the stops. It is also obvious that the flange $d$ may be placed on the stationary disk and surround the end of the roller, as its function is to inclose the space between the two disks D and E, and thereby form a chamber for the ball or disk F.

I therefore claim—

In combination with the chambered roller C, spring B, and axis A, the disk E, flanged disk D, stops *g h*, and loose ball or disk F, all constructed and arranged as herein shown, for the purpose set forth.

SAML. F. HAY

Witnesses:
PHILIP O. REILLY,
E. N. ELIOT.